Figure 1:
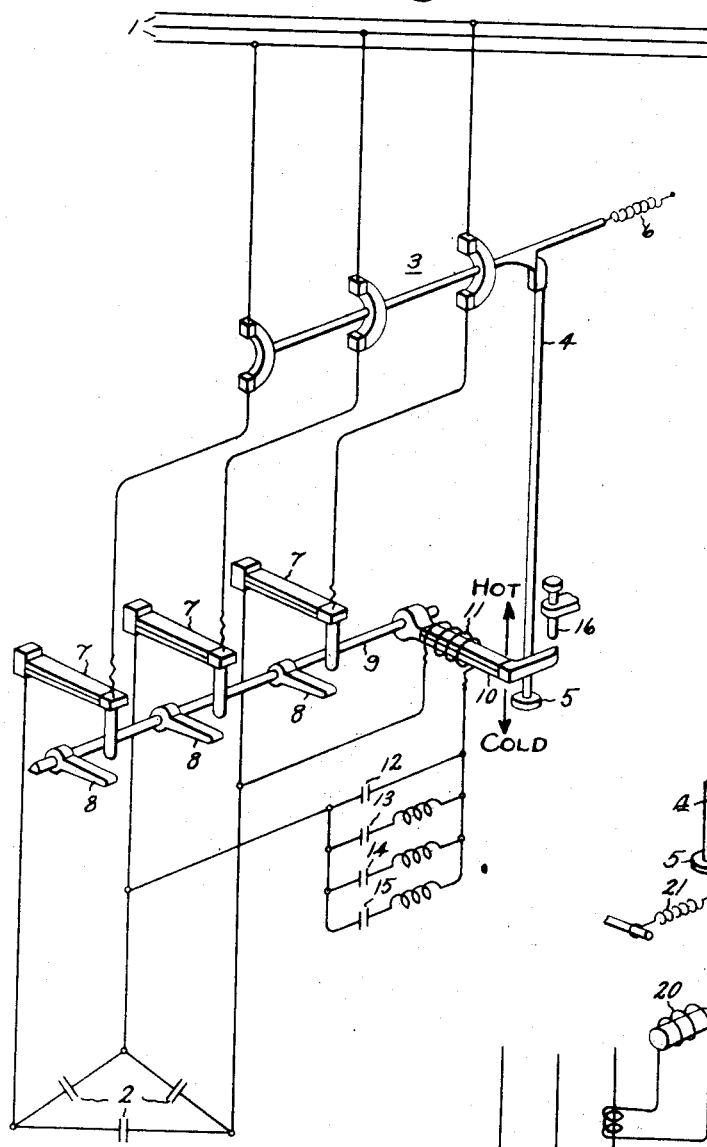

Nov. 16, 1937.  F. METZGER  2,099,568

REACTANCE ELEMENT CONTROL

Filed Dec. 6, 1935

Inventor:
Friedrich Metzger,
by Harry E. Dunham
His Attorney.

Patented Nov. 16, 1937

2,099,568

UNITED STATES PATENT OFFICE 2,099,568

REACTANCE ELEMENT CONTROL

Friedrich Metzger, Berlin-Tempelhof, Germany, assignor to General Electric Company, a corporation of New York Application December 6, 1935, Serial No. 53,263
In Germany December 15, 1934

7 Claims (Cl. 172—246)

My invention relates to reactance element control and more particularly to the automatic control of the coupling between an alternating current circuit and a reactance element by means of harmonics.

By reactance element I mean either a capacitive reactance element or an inductive reactance element. Capacitive reactance elements are electric condensers which are commonly referred to in the art as capacitors when they are static devices so as to distinguish them from non-static electric condensers such, for example as synchronous condensers. Inductive reactance elements are commonly referred to in the art as reactors, and may be either of the air core type or the type having a magnetic core, which magnetic core may either be saturable or unsaturable and if saturable either self-saturable by alternating current flux or separately saturable by means of a direct current saturating winding.

Such reactance elements are coupled to alternating current circuits for a wide variety of reasons. By the term "coupled" I mean either conductively coupled, as by an ordinary direct electrical connection, inductively coupled, as by a transformer, or capacitively coupled as by means of a coupling capacitor, and this coupling may either be such as to produce a series circuit relation between the element and the circuit or a shunt or parallel circuit relation between the element and the circuit. With capacitors for example, they may be connected in series in alternating current transmission and distribution circuits so as to neutralize the inductive reactance of such circuits thereby improving the voltage regulation and increasing the power limits of synchronous systems or they may be connected in parallel with such circuits for the purpose of improving the power factor of such circuits. Reactors may be connected either in series with alternating current circuits so as to limit the current therein, for retarding current surges therein or for controlling the current therein, or they may be connected in parallel with such circuits for various regulating purposes.

It is well known that the ohmic impedance value of an inductive reactance element changes in proportion to changes in the frequency of the current therein while the ohmic impedance value of a capacitive reactance element changes inversely with changes in the frequency of the current therein. In many alternating current circuits the wave form of the potential varies relatively widely from almost sinusoidal to shapes which are quite far from sinusoidal. The non sinusoidal wave shapes are caused by the presence of harmonics which are fractional or multiple frequency components of the main fundamental frequency wave. These harmonics being of a different frequency from the fundamental frequency often cause objectionable and even dangerous operating conditions in the reactance elements.

As an example of a situation where harmonics may affect the intended operation, consider a shunt capacitor installation for power factor improvement. Such capacitors are manufactured for a given rated normal voltage, but obviously some permissible range of safe operation above this normal rated voltage must be allowed for so that for example such a capacitor may be designed and constructed so that it will not operate without injurious overloading or over-heating if the voltage applied to its terminals is 15% above the rated normal voltage. The usual way of protecting such a capacitor against objectionably high over voltages is by means of a switch or circuit breaker which is tripped open in response to current in the capacitor which is higher than that which would be produced by the normal line voltage, it being assumed that the voltage is substantially sinusoidal in wave form. Such an arrangement operates satisfactorily under normal conditions. At light load however, the circuit may be energized by relatively old generators which have poor voltage wave shape containing marked higher frequency harmonics. These higher frequency harmonics produce an increase in current in the capacitor which is out of proportion to a change in the effective or root-mean-square value of the alternating potential. Under certain circumstances it may be undesirable, however, to have the circuit breaker trip in response to the harmonic currents but if the current setting of the tripping means for the circuit breaker is adjusted so as not to cause tripping in response to the harmonic currents then the setting will be relatively insensitive to voltage magnitude changes of the fundamental and the proper protection will not be secured under normal conditions. Accordingly, I may provide harmonic responsive means for automatically raising the setting of the tripping means for the circuit breaker so that the breaker will not be tripped in response to the harmonic currents but when these harmonic currents disappear the setting of the breaker is restored to normal so that proper protection is secured for voltage variations of fundamental frequency.

On the other hand it may be desirable to have the breaker tripped in response to these harmonic currents in which case the harmonics responsive means may be made to lower the setting of the tripping means for the circuit breaker. In this manner the capacitor will be protected against overloading due to voltage changes of the fundamental frequency and will also be protected against overloading due to harmonics of higher frequency.

From another point of view it will sometimes be desirable to disconnect the shunt capacitor from the circuit automatically at no load. This is because at no load there is little or no lagging inductive current for the capacitor to neutralize and hence the load on the circuit is largely made up of the power factor correcting capacitor which then draws a resultant leading current through the circuit inductive reactance thereby causing a voltage rise in the circuit from the generator out to the point where the capacitor is connected in shunt to the circuit. This rise above normal voltage may not be as great as the normal variation in voltage but when added to the maximum value of the variable voltage the total voltage may be objectionable. However, it will be impractical to utilize voltage responsive means to disconnect the capacitor at light load for the voltage variation at light load, as pointed out above may not be any greater than the normal voltage variations. Consequently, the fact that harmonics appear at light load may be utilized to perform this disconnecting function.

An object of my invention is to provide a new and novel reactance element control arrangement.

Another object of my invention is to provide an arrangement for controlling a reactance element in accordance with harmonics.

A further object of my invention is to provide automatic means in response to harmonics for controlling the coupling either in whole or in part between the reactance element and an alternating current circuit.

My invention will be better understood from the following description taken in connection with the accompanying drawing and its scope will be pointed out in the appended claims.

Figure 2:
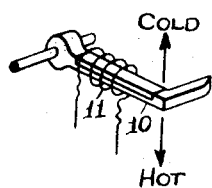
Figure 3:
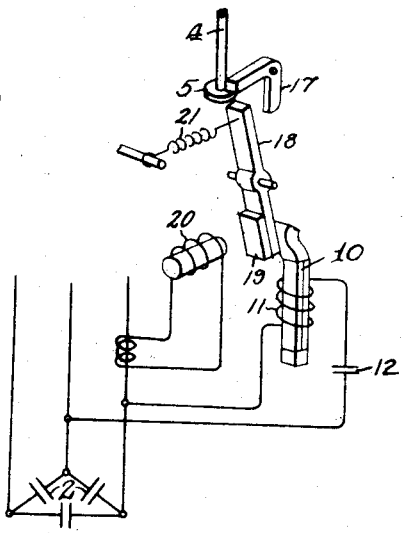

In the drawing Fig. 1 is a diagrammatic showing of an embodiment of my invention and Figs. 2 and 3 illustrate modifications thereof.

In Fig. 1 of the drawing there is shown a three-phase alternating current circuit 1 having connected thereto a shunt capacitor 2 in the form of a mesh connected three-phase unit. Capacitor 2 is coupled to the circuit 1 by means of a circuit breaker 3 for making and breaking the electrical connection between the circuit 1 and the capacitor 2. The circuit breaker 3 is normally closed and is provided with any suitable tripping means for opening it. As shown, this means may consist of a latch 4 which, when the lower end thereof 5 is moved downwardly, releases and allows a spring 6 to open the breaker. The latch 4 is tripped by means of current responsive elements in the form of thermally deformable members 7 which are heated by the current in the phase conductors supplying the capacitor and which, when heated to a certain point, bend enough to engage levers 8 fastened to a shaft 9 which then will be rotated in such a manner as to cause another lever 10 to press downwardly against the lower end 5 of the latch 4.

With such an arrangement changes in the voltage of circuit 1 will cause changes in the current taken by the capacitor 2 and these changes in current will cause variable amounts of heating in the elements 7 which are so calibrated that if the current exceeds a certain value corresponding to a certain maximum safe voltage rise above normal, the circuit breaker will be tripped open. For example, if the rate of safe continuous loading of the capacitor corresponds to 100% loading at 100% applied voltage, then an increase in voltage of 15% will, if the voltage wave is substantially sinusoidal, cause an increase in current of 15% thereby causing an increase in loading of approximately 32%. Assuming that this is the maximum permissible overloading then the circuit breaker can be set to trip at a 15% over-current value.

As has been previously explained, however, the wave of the voltage of a power circuit such as circuit 1 is not always sinusoidal and at certain times contains marked harmonics. Under such circumstances the current taken by the capacitor varies widely from what it would be if the voltage wave were sinusoidal. Under some circumstances it may be desirable to lower the setting of the breaker during these conditions and under other circumstances it may be desirable to raise the setting. Either one of these objects may be accomplished in a number of different ways. For example, the lever 10 may be a bimetallic member which, when heated bends so as to move its right-hand end either upwardly as in Fig. 1 or downwardly as in Fig. 2. A heating winding 11 may be wound on the bimetallic lever 10 and this winding may be connected between two of the conductors supplying the capacitor through a second capacitor 12. With such an arrangement the current in the heating winding 11 will be sensitive to harmonics in the supply voltage for the same reason that the capacitor 2 is sensitive to the harmonics. Therefore, increases in the harmonics of the supply circuit will increase the heating effect of the winding 11 and this heating effect may be made to cause the right-hand end of the lever 10 to move either upwardly or downwardly. If it moves upwardly it raises the current setting of the circuit breaker 3, while if it moves downwardly it lowers the current setting. That is to say, when the current setting is raised it requires a higher current for the breaker to be tripped and when the current setting is lowered it requires a lower current for the circuit breaker to be tripped. As has been explained previously, there are certain times when one of these operations is preferable and there are other times when the opposite operation is preferable. The setting may also be lowered so much that the breaker is tripped substantially solely in response to the presence of harmonics.

If it is desired to eliminate substantially the effect of changes in the amplitude of the fundamental frequency wave of the voltage the capacitor 12 and the heating winding 11 may be tuned for resonance at a particular value of frequency for example, these elements may act as a filter for all frequencies except the triple or third harmonic frequency. The setting of the breaker may be controlled in response to other harmonics by providing additional filters. For example, a filter 13 comprising a series capacitor and inductance may be designed as a filter for all except the fifth harmonic, while another filter 14 may be designed to pass only the seventh, and still another filter 15 may be designed to pass only the eleventh harmonic, etc. In this manner, the setting of the tripping means for the circuit breaker may be made extremely sensitive to any desired number of harmonics while being relatively insensitive to changes in amplitude of the fundamental frequency wave.

If desired a stop 16 may be provided for limiting the upward movement of the bimetallic lever 10.

In the modification shown in Fig. 3 circuit breaker 3 is arranged to be tripped by electromagnetic means instead of by thermally deformable means. As shown, the lower end 5 of the latch member for the breaker is arranged to be moved downwardly by means of a pivoted bellcrank member 17 which is engaged by a pivoted arm 18, having at one end thereof an armature 19 which is attracted by an electro-magnet 20. If this magnet 20 is energized in accordance with the current taken by the capacitor 2 the arrangement will act as a protective means for the capacitor 2. In order to change the setting of the arrangement shown in Fig. 3 in response to harmonics the bimetallic lever 10 is arranged to move to the right or left in response to heating thereby varying the air gap between the armature 19 and magnet winding 20 and thereby changing the value of current through the winding 20 which is required for the armature 19 to be attracted against the spring 21 and move to a position where it will trip the member 5. The bimetallic member 10 is heated as in Fig. 1 by the heating winding 11 which is energized through the capacitor 12.

Instead of a bimetallic strip any other device can be used which is suitable to influence the setting of the circuit breaker.

While I have shown and described particular embodiments of my invention, it will be obvious to those skilled in the art that changes and modifications may be made therein, and consequently I aim in the appended claims to cover all such changes and modifications as fall within the true spirit and scope of my invention.

What I claim as new and desire to secure by Letters Patent of the United States is:

1. In combination, an alternating current circuit having a potential of varying wave form, a capacitor, a circuit breaker for connecting said capacitor in shunt to said circuit, means responsive to the current in said capacitor for controlling the opening of said circuit breaker, and means responsive to harmonics in the potential of said circuit for varying the current setting of said circuit breaker.

2. In combination, an alternating current circuit having a potential of varying wave form, a capacitor connected to said circuit, overload protective means for said capacitor, and means responsive to harmonics in said circuit for raising and lowering the current setting of said protective means depending upon whether the harmonics increase or decrease.

3. In combination, a capacitor, an alternating current power circuit, means for coupling said capacitor to said power circuit, said circuit being subject to producing sustained pronounced harmonic currents of its fundamental frequency during certain conditions of otherwise normal operation when said capacitor is coupled thereto, and means responsive to the presence of said harmonic currents for changing the coupling between said circuit and said capacitor without interrupting said power circuit during the existence of said harmonics in said circuit in order to eliminate the interaction between said harmonics and said capacitor.

4. In combination, an alternating current power circuit having a normal fundamental frequency and an occasional abnormal harmonic frequency, a static reactance element for improving a reactance characteristic of said power circuit at said normal fundamental frequency normally coupled to said circuit, means for changing the coupling between said element and said circuit without opening said circuit, means responsive to over-loading of said element at said normal fundamental frequency for operating said coupling changing means, and separate auxiliary means responsive to harmonics in said circuit for causing the operation of said coupling changing means.

5. An alternating current power circuit having a normal fundamental frequency and an occasional abnormal harmonic frequency, a capacitor for improving the reactive characteristics of said power circuit at said normal fundamental frequency normally coupled to said power circuit, means for changing the coupling between said capacitor and said circuit without opening said circuit, means responsive to over-loading of said capacitor at said normal fundamental frequency for operating said coupling changing means, and separate auxiliary means responsive to harmonics in said circuit for causing the operation of said coupling changing means.

6. In combination, an alternating current power circuit having a normal fundamental frequency and an occasional abnormal harmonic frequency, a capacitor for improving the reactive characteristics of said power circuit at said normal fundamental frequency normally coupled to said power circuit, means including a switch for changing the coupling between said capacitor and said circuit without opening said circuit, means responsive to over-loading of said capacitor at said normal fundamental frequency for operating said switch, and separate auxiliary means responsive to harmonics in said circuit for causing the operation of said switch.

7. In combination, an alternating current power circuit having a normal frequency and an abnormal harmonic frequency current, a capacitor for improving the reactive characteristics of said circuit normally coupled thereto, means including a switch for changing the coupling between said capacitor and said circuit without interrupting said circuit, and means responsive to said abnormal harmonic frequency current for causing operation of said switch.

FRIEDRICH METZGER.